United States Patent [19]

Schulze

[11] 4,129,716

[45] Dec. 12, 1978

[54] UREA-ALDEHYDE RESINS

[75] Inventor: Heinz Schulze, Austin, Tex.

[73] Assignee: Texaco Development Corporation, New York, N.Y.

[21] Appl. No.: 804,130

[22] Filed: Jun. 6, 1977

Related U.S. Application Data

[63] Continuation of Ser. No. 717,062, Aug. 24, 1976, abandoned.

[51] Int. Cl.$^2$ .................. C08G 12/12; C08G 14/02
[52] U.S. Cl. ................................ 528/68; 528/69; 528/76; 528/245; 528/246; 528/264
[58] Field of Search ............... 260/52, 21, 68, 70 R, 260/553 R, 584 B, 69 R

[56] References Cited

U.S. PATENT DOCUMENTS

| | | | |
|---|---|---|---|
| 2,858,295 | 10/1958 | Melamed | 260/68 |
| 3,184,423 | 5/1965 | Schlack | 260/21 |
| 3,324,082 | 6/1967 | Sonnabend | 260/52 |
| 3,324,176 | 6/1967 | Kirschnek et al. | 260/553 R |
| 3,654,370 | 4/1972 | Yeakey | 260/584 B |

Primary Examiner—Thomas De Benedictis, Sr.
Attorney, Agent, or Firm—Carl G. Ries; Thomas H. Whaley; Kenneth R. Priem

[57] ABSTRACT

A novel polyether containing urea-aldehyde resin useful in plastics, sealants, molds, foams and coatings. The novel composition comprises the condensation product of a ureido-terminated polyoxyalkylene and an aldehyde. The ureido terminated polyoxyalkylene compound is prepared by reacting a primary amine terminated polyoxyalkylene with urea at temperatures in the range of about 120° C to about 160° C in a molar ratio of about 1 molecule of urea for each primary amino group.

10 Claims, No Drawings

UREA-ALDEHYDE RESINS

This is a continuation, of application Ser. No. 717,062, filed Aug. 24, 1976, and now abandoned.

BACKGROUND OF THE INVENTION

1. Field of the Invention

This invention generally pertains to urea-aldehyde resins and more particularly to ureido-terminated polyoxyalkylene-aldehyde condensation products.

2. Prior Art

Urea-aldehyde resins are well known in the art. The most common is the condensation product of urea and formaldehyde. Valuable resinous condensation products can also be obtained by condensing compounds having, in general, one or more terminal ureido or thioureido groups with aldehydes such as formaldehyde or formaldehyde producing compounds. The condensation reactions proceed rapidly under facile conditions. The physical characteristics of the condensate can be varied by choice of the ureido or thioureido terminated compound utilized.

Generally ureido and thioureido terminated compounds, including aliphatic or aromatic diureides, are well known. For example it has been disclosed in U.S. Pat. No. 2,145,242 to Arnold that diureido terminated aliphatic compounds can be produced by reacting an aliphatic diamine with urea. Additionally, polyalkylenepolyamine-containing compounds having primary or secondary amine termination are shown to form ureido containing compounds. For example, triethylenetetramine can be reacted with urea at temperatures of 120° C to 160° C to form thermoplastic resinous polymers soluble in alcohols, ketones, and esters but insoluble in hydrocarbons and only limitedly soluble in water.

Further, it has been disclosed that aliphatic primary diamines and particularly those wherein the amine groups are separated by alkylene hydrocarbons yield crystalline monomeric compounds when reacted with urea. These compounds have a relatively high melting point, i.e., 180° C–190° C and are relatively insoluble in even boiling alcohol. Additionally, Arnold discloses that mono oxy-containing amines yield ureas which are similar in characteristic.

It has now been discovered that polyether-containing urea-formaldehyde resins can be easily produced in homogeneous, aqueous solution using aldenydes or aldehyde-forming compounds and ureido terminated polyoxyalkylenes. The novel condensation products can be conventionally cured to produce a resilient, dense, water containing material which shows minimal shrinkage.

SUMMARY OF THE INVENTION

According to the broad aspect of the invention, a urea-aldehyde resin comprises the condensation product of a ureido terminated polyoxyalkylene material and an aldehyde. The ureido terminated polyoxyalkylenes are formed by reaction of a ureido group forming compound and a polyoxyalkylenepolyamine of the formula $$[H_2N(CHCHO)_n]_r-Z$$
$$\phantom{[H_2N(}Y\phantom{CH}H$$

wherein Y is hydrogen, a methyl radical or an ethyl radical; Z is a hydrocarbon radical having from 2 to 5 carbon atoms forming from 2 to 4 external ether linkages; n is a number from 1 to about 20 and r is a number from 2 to 4.

DESCRIPTION OF THE PREFERRED EMBODIMENT

According to a preferred embodiment, a ureido terminated polyether is initially prepared by admixing and reacting a polyoxyalkylenediamine or triamine having a molecular weight from about 400 to 2,000 with urea at temperatures of from about 130° to 140° C until ammonia gas development ceases. The crude reaction product is then stripped at about 100° C in vacuum to remove excess ammonia. The recovered product is then conventionally combined with an aldehyde, in aqueous medium, to form the resin.

The ureido terminated polyoxyalkylene used in accordance with the instant invention are those compounds containing a polyoxyalkylene radical and terminal ureido groups of the formula $$\underset{\|}{\overset{O}{-NHC-NH_2}}$$

The polyoxyalkylene polyamines useful in forming the ureido terminated compounds can be depicted by the formula:

$$[H_2N-(CH-CH-O)_n]_r-Z$$
$$\phantom{[H_2N-(}Y\phantom{-CH}H$$

wherein Y is hydrogen, a methyl radical or an ethyl radical; Z is a hydrocarbon radical having from 2 to 5 carbon atoms forming from 2 to 4 external ether linkages; n is a number from 1 to about 20 and r is a number from 2 to 4. The most preferred polyoxyalkylenepolyamines are the polyoxypropylenediamines wherein Y is a methyl radical, n is a number from 2 to 17 Z is a 1,2-propylene radical and r is about 2 or 3. These polyoxyalkylenepolyamines can be prepared by known methods as disclosed in U.S. Pat. Nos. 3,236,895 and 3,654,370.

Generally, the ureido terminated compounds are formed by the reaction of the polyoxyalkylenepolyamine with a ureido forming compound. The most preferred ureido forming compound is urea. When urea is employed as a reactant, the reaction proceeds with the evolution of ammonia and the terminal primary amino groups of the polyoxyalkylenepolyamine are converted directly to ureido groups.

While urea is the preferred ureido forming compound, other ureido forming compounds can be utilized within the scope of the invention. Since the polyoxyalkylenepolyamine reactant already contains terminal primary amino groups, compounds which supply the $$\underset{\|}{\overset{O}{C-NH_2}}$$

radical can be utilized. Examples of such compounds are the isocyanates of the general formula $M^+CNO^-$ wherein $M^+$ is generally an alkali metal such as potassium, sodium and the like. The preferred isocyanates that can be used in accordance with the instant invention are sodium and potassium isocyanate primary because of availability.

The functionality of the polyoxyalkylenepolyamine is dependent upon the number of terminal primary amino groups. It will be realized that each molecule of ureido forming compound reacts with a single terminal primary amino group of the polyoxyalkylenepolyamine. It is particularly important that in forming the compounds of the instant invention a specific molar ratio of reactants be maintained. Specifically, about 1 molecule of ureido forming compound for each amino group of the polyoxyalkylenepolyamine is required. Thus, for example, with a diamine about 2 moles of ureido forming compound is utilized for each mole of polyoxyalkylenepolyamine. Preferably the instant reaction is carried out in the presence of a slight excess of ureido forming compound to assure complete conversion of the amino groups. The polyether ureido terminated compounds used in the instant invention can be simply described as polyoxyalkylene containing compounds having terminal ureido groups. In accordance with the greatly preferred embodiment, the ureido terminated compounds are of the formula:

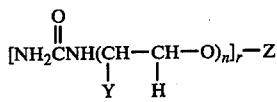

wherein Y is hydrogen, a methyl radical or an ethyl radical; Z is a hydrocarbon radicals having 2 to 5 carbon atoms forming from 2 to 4 external ether linkages; n is a number from 1 to about 20; and, r is a number from 2 to 4. The most preferred polyoxyalkylenepolyamines are the polyoxypropylenediamines wherein Y is a methyl radical; n is a number from 2 to 17, Z is a 1,2-propylene radical and r, is about 2 or 3.

According to another embodiment, the ureido terminated compounds contain polyether ureylene or thioureylene groups in the chain. In accordance with this aspect, a polyoxyalkylene ureylene or thioureylene having terminal primary amino groups is the oligomeric condensation product of a polyoxyalkylenepolyamine with a urea or thiourea forming compound. In accordance with this aspect of the invention, these ureido terminated polyether ureylene or thioureylene compounds are formed by initially reacting a molar excess of polyoxyalkylenepolyamine with a ureylene forming compound or a thioureylene forming compound to produce an oligomeric product having terminal primary amino groups. In a second step the primary amino terminated polyether product is reacted in a molar ratio of 1 molecule of ureido forming compound for each amino group to form the ureido terminated compounds that can be used in accordance with the instant invention. These compounds can be depicted by the following formula

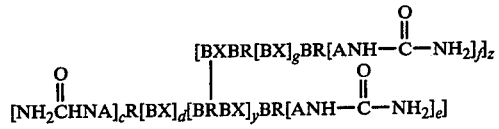

wherein A is a polyoxyalkylene radical containing from about 1 to 17 oxyalkylene groups, B is a polyoxyalkylene amino radical containing from about 1 to 17 oxyalkylene groups, R is a hydrocarbon radical having from 2 to 5 carbon atoms and forming from 2 to 4 oxycarbon linkages with A and B, X is a C=O radical, a C=S radical or a radical derived from a difunctional isocyanate having two

groups, c and d are from 1 to 3 chosen such that their sum is from 1 to 4, e is a number from 1 to 3, f is a number from 1 to 3, g is a number from 1 to 3, y is a number from 0 to about 5, and z is a number from 0 to 2.

The polyether ureylene or thioureylene precursors that may be reacted with urea to form terminal ureido containing compounds in accordance with this aspect of the instant invention can be depicted by the following formula:

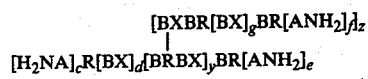

wherein A is a polyoxyalkylene radical containing from about 1 to about 17 oxyalkylene groups wherein each oxyalkylene group contains from 2 to about 4 carbon atoms; B is a polyoxyalkylene amino radical containing from about 1 to 17 oxyalkylene groups wherein each oxyalkylene group contains from 2 to about 4 carbon atoms; R is a hydrocarbon radical having from 2 to 5 carbon atoms forming from 2 to 4 oxycarbon linkages with A and B; X is a C=O radical, a C=S radical or a radical derived from a difunctional isocyanate having two

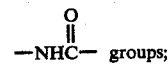

c and d are from 1 to 3 chosen such that their sum is 2 to 4; e is a number from 1 to 3; f is a number from 1 to 3; g is a number from 1 to 3; y is a number from 0 to about 5; z is a number from 0 to 2.

Preferably these precursors are depicted by the above formula wherein A corresponds to the formula:

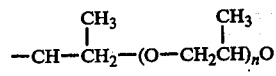

wherein n is a number from 0 to 16 preferably a number from 1 to 10, B corresponds to the formula:

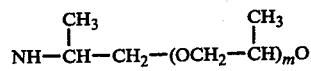

wherein m is a number from 0 to 16 and preferably a number from 1 to 10, c and d are from 1 to 2 chosen such that their sum is from 2 to 3, e is a number from 1 to 2, g is a number from 1 to 2, f is a number frm 1 to 2, z is a number from 0 to 1, y is a number from 1 to 4, and X is a C=O radical.

The primary amino terminated polyether ureylene compound is preferably formed by reacting from about 2.0 mols to about 1.2 mols of the polyoxypropylenepolyamine with 1 mol of urea at temperatures from about 100° C to about 200° C.

These polyether ureylenes can be formed by reaction of a polyoxyalkylenepolyamine wherein the alkylene contains from 2 to about 4 carbon atoms with urea, a ureylene forming compound, or an organic bifunctional isocyanate.

The primary amino terminated polyether thioureylene can be formed by reaction of a polyoxyalkylenepolyamine wherein the alkylene contains from 2 to about 4 carbon atoms with thiourea, a thioureylene forming compound or carbon disulfide.

The most preferred polyether thiourylene compound is that formed by reacting from about 5.0 mols to about 1.2 mols of polyoxypropylenepolyamine having a molecular weight of about 200 to about 2000 with 1 mol of carbon disulfide at temperatures from about 10° C to about 150° C. It has been found that addition of greater than about .5 moles of carbon disulfide per mole of polyoxyalkylenepolyamine produces highly viscous reaction mixtures. Therefore, suitable nondeleterious diluents well known in the art may be utilized to facilitate the reaction.

A preferred class of polyoxyalkylenepolyamines useful in forming the polyether compounds may be depicted by the formula:

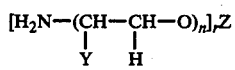

wherein Y is hydrogen, a methyl radical or an ethyl radical; Z is a hydrocarbon radical having 2 to 5 carbon atoms forming from 2 to 4 external ether linkages; n is a number from 1 to about 17 and r is a number from 2 to 4. The most preferred polyoxyalkylenepolyamines are the polyoxypropylenediamines wherein Y is a methyl radical, n is a number from 1 to 10, Z is a 1,2-propylene radical and r is about 2.

Whenever urea is employed as the reactant, the reaction proceeds with the evolution of ammonia. Since urea is bifunctional, each molecule of urea can react with two terminal amino groups of the polyoxyalkylenepolyamine. Consequently, it is possible to form polyureylenes in which the polyether ureylene unit repeats in the molecular structure.

While urea is the preferred reactant, other urea forming compounds may be utilized with the scope of the invention to supply the linking

Since the polyoxyalkylenepolyamine reactant already contains terminal primary amino groups, compounds such as carbonyl diimidazole, phosgene, and diphenyl carbonate may be used to supply the

to form ureylene linkages without the liberation of ammonia.

Another class of polyether ureylenes which are useful are formed by reaction of polyoxyalkylenepolyamines with a bifunctional organic isocyanate obtained for instance from the phosgenated condensation product of aniline and formaldehyde. One suitable compound can be represented by the formula:

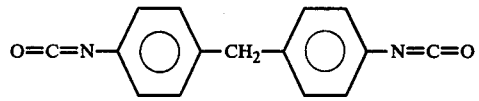

4,4'diphenylmethanediisocyanate or the isomers thereof such as 2,4'diphenylmethanediisocyanate. Mixtures of the isomers can also be used.

Whenever thiourea is employed as the reactant, the reaction proceeds with the evolution of ammonia. The functionality of the polyoxyalkylenepolyamine is dependent upon the number of terminal primary amino groups. Since thiourea, like urea, is bifunctional, each molecule of thiourea can react with two terminal amino groups of the polyoxyalkylenepolyamine. Consequently, it is possible to form polythioureylenes in which the thioureylene unit repeats in the molecular structure.

Whenever carbon disulfide is employed as the reactant in preparing the thiourea precursor compounds the reaction proceeds in two steps. The carbon disulfide is initially added to the reaction mixture at temperatures below the boiling point of carbon disulfide, e.g., less than 40° C. The reaction mixture is then heated to a temperature of from about 50° C to about 150° C until the evolution of hydrogen sulfide ceases. In this reaction one mole of carbon disulfide will react with two moles of the polyoxyalkylenediamine to form the polyether thioureylene product.

While carbon disulfide is the preferred reactant, other thioureylene forming compounds may be utilized within the scope of the invention to supply the linking

Since the polyoxyalkylenepolyamine reactant already contains terminal primary amino groups, compounds such as a dithioisocyanate, and thiophosgene can be used to supply the

to form thioureylene linkages.

Another class of polyether containing compounds which are useful in the practice of this invention, are mixed polyether ureylene thioureylene compounds. Thus in accordance with this aspect of the invention

and

are interspersed throughout the polyether chain to yield a mixed polyether ureylene-thioureylene.

The aldehydes that can be generated used within the scope of the instant invention are those carbonyl compounds containing at least one hydrogen attached to the carbonyl carbon atom. It will be realized that the aldehydes utilized will depend upon the resin application and the properties of the desired product. Generally, any of those aldehydes which are known to react with urea or ureido containing compounds can be utilized. Examples include glyoxal, acetaldehyde, acrolein, furfural, formaldehyde, and the like.

It is generally well known that the aldehydes containing higher carbon constituents do not react as readily. Therefore, based on availability as well as product use, formaldehyde is the preferred aldehyde.

Additionally a mixture of aldehydes may be utilized in order to obtain a mixed polymeric structure. Likewise, it is well known that mixtures of ureido terminated compounds and/or ureas may afford more versatile polymers.

The urea-aldehyde resins of the instant invention are generally reaction products of at least one ureido terminated polyoxyalkylene material which can be admixed with one or more other ureido terminated compound and/or urea with an aldehyde. These resins are generally prepared in two steps First, a precursor, oligomeric urea-aldehyde product is formed. The precursor is then polymerized and/or crosslinked in the presence of an effective amount of an acid catalyst. In accordance with the instant invention, the aldehyde addition takes place expeditiously in an aqueous medium. An outstanding advantage of the instant invention is that the polyoxyalkylene ureido terminated compounds are miscible with aqueous formaldehyde.

Preferably, in a first step, an aqueous formaldehyde solution is brought into intimate contact with the ureido terminated compounds at temperatures from about ambient to about 60° C. The resultant reaction admixture is then combined with an effective amount of a known acid catalyst, such as ammonium chloride, and cured at ambient or higher temperatures in accordance with well known procedures, temperatures and conditions.

It should be noted that since the ureido-terminated compounds of the instant invention are water miscible, that both the precursor formation as well as the final cure may take place in the presence of water. Additionally, it has been found that the pressure normally associated with curing urea-formaldehyde resins such as, for example, in the presence of cellulosic materials need not be used. One advantage of the "water cured" resins is that minimal material shrinkage is experienced. Since the water containing resins of the instant invention do not tend to dehydrate upon standing, the water acts as an inexpensive filler or extender.

The invention will be further illustrated by the following specific examples, which are given by way of illustration and not as limitations on the scope of this invention.

EXAMPLE I

In this example a polyether bisureide, for use in accordance with the instant invention, was prepared. Into a suitable reaction vessel, equipped with stirring apparatus, were added 36.5 lbs (40 moles) of a polyoxypropylenepolyamine having a molecular weight of approximately 400, and an analysis of 4.83 miliequivalents (meq.) primary amine/g (about 5.0 meq. total amine/g) sold under the tradename "JEFFAMINES ® D-400" by Jefferson Chemical Co., Austin, Texas 78751 and 15.89 lbs of urea (120 moles). The admixture, while being continuously stirred, was flushed with nitrogen and heated to 125° C. This temperature was maintained until the evolution of ammonia had diminished (approximately 120 minutes). The kettle temperature was then raised to about 130° C and when ammonia development had again slowed, a second portion of 18.3 lbs (20 moles) of "JEFFAMINES ® D-400" was added slowly in aliquots over a 70 minute period while the temperature was maintained at between 130° C and 133° C. While the temperature was maintained, the mixture was stirred for about 3½ hours until gas development had completely ceased. The crude reaction mixture was then stripped at 110° C/5 mm Hg to produce a resinous reaction product which analyzed as follows: 10.3% N, 0.02 meq. total amine/g.

EXAMPLE II

According to the procedure of Example I, 1980 grams (1 mole) of a polyoxypropylene polyamine having a molecular weight of about 2000 and analysis of 1.01 meq. primary amine/g sold under the tradename of "JEFFAMINES ® D-2000" was reacted with 180 grams (3.0 moles) urea by stirring the admixture under a nitrogen pad for 2 hours at 130°-134° C. A second portion of "JEFFAMINE ® D-2000" consisting of 990 grams (0.5 moles) was added over a 3 hour period at a temperature of about 132° C. The reaction mixture was maintained at 134° C for another 70 minutes, during which time the admixture was vigorously stirred to continuously wash the sublimate on the upper surface of the reaction vessel. The crude reaction product was then stripped at 130° C/1.4 mm Hg to produce a viscous residue which upon analysis showed 2.54% N, 0.01 meq. total amine/g.

EXAMPLE III

Using the procedure and apparatus of Example I, a tris(ureide) was prepared by reacting and admixing 2169 grams (4.5 moles) of a 400 molecular weight triamine having an analysis of 6.23 meq. primary amine/gram and 810 grams (13.5 moles) urea at a temperature of about 134° C. After cessation of ammonia evolution, the crude reaction product was stripped at 140° c/1 mm/Hg to give a resinous product which upon analysis showed 13.57% N, 0.17 meq. total amine/g.

The following three examples (IV-VI) show the preparation of the polyether ureylene precursor having primary terminated amines.

EXAMPLE IV

Into a reaction vessel were added 3,618 g (9.0 moles) of a polyoxypropylenepolyamine having a molecular weight of approximately 400 and an analysis of 4.98 meq. primary amine/g 5.0 meq. total amine/g. sold under the name "JEFFAMINE ® D-400" by Jefferson Chemical Co., Austin, Texas 78751, and 270 g of urea (4.5 moles). The mixture was heated gradually to 198° C and maintained at this temperature until the evolution of ammonia ceased. The reaction mixture was then stripped at 130° C at a pressure 1 mm Hg. A viscous liquid polyether-ureylene having terminal primary amino groups was obtained having an osmometric molecular weight of 650 and which analyzed as follows: 6.6% N, 2.3 meq total amine/g., 2.20 meq. primary amine/g.

EXAMPLE V

According to the procedure of Example IV, 3,618 g (9.0 moles) of a polyoxypropylenepolyamine sold under the name "JEFFAMINE ® D-400" by Jefferson Chemical Co., Austin, Texas 78751 was reacted with 450 g of urea (7.5 moles). A viscous polyether-ureylene having terminal primary amino groups was obtained having an osmometric molecular weight of approximately 1720 and which analyzed as follows: 6.19% N, 0.91 meq. total amine/g, 0.71 meq. primary amine/g.

EXAMPLE VI

In a reaction vessel under an inert atmosphere, 402 g (1.0 mol) of a polyoxypropylenepolyamine sold under the name "JEFFAMINE® D-400" by Jefferson Chemical Co., Austin, Texas 78751 was heated to 170° C with vigorous stirring. The heat source was then removed and 66 g (0.5 meq) of a polyisocyanate obtained by phosgenation of an anilineformaldehyde condensate (7.56 meq. NCO/g) was added to the amine over a period of 5 minutes. The reaction mixture was then heated to 245°–250° C and maintained at that temperature for 15 minutes. The reaction mixture was then cooled. The polyether-ureylene having terminal primary amino groups was found to have an osmometric molecular weight of 560 and analyzed as follows: 7.35% N, 2.71 meq. primary amine/g.

The following two examples (VII-VIII) show preparation of the polyether thioureylene precursor and the polyether ureylene-thioureylene precursor, respectively.

EXAMPLE VII

Into a reaction vessel containing 824 g (1.89 mol) of a polyoxypropylenediamine having a molecular weight of approximately 436 was added 23 ml (0.38 mol) of carbon disulfide at a temperature of 10° C. The carbon disulfide was added below the surface of the liquid in the reaction vessel over a period of 70 minutes. Over the next hour, the contents of the reaction vessel were warmed to 25° C and then the mixture was heated at 100° C for 30 minutes until the evolution of hydrogen sulfide ceased. The reaction mixture was then stripped at 100° C at a pressure of 1 mm Hg. The polyether thioureylene obtained had an osmometric molecular weight of 522 and analyzed as follows: 0.67% N, 3.38 meq primary amine/g.

EXAMPLE VIII

A mixed polyether ureylene-thioureylene compound was prepared in three steps. First, a polyether ureylene having terminal primary amino groups was prepared by reaction 2,916 (12.0 moles, 8.23 meq. primary amine/g) of a polyoxypropylenepolyamine having a molecular weight of about 240 sold by Jefferson Chemical Company, Austin, Texas 78751 under the name "JEFFAMINE® D-230" with 360 g (6.0 moles) of urea at a temperature of 198° C until the evolution of ammonia has ceased.

In a second step, 702 g (about 1.5 moles) of the polyether ureylene prepared in the first step was brought to a temperature of about 20° C and 46 ml (0.75 moles) of carbon disulfide was added over a period of 65 minutes. At the end of the carbon disulfide addition, the temperature of the reaction mixture had increased to about 95° C. The reaction mixture was then heated to a temperature of about 100° C where it was maintained for about 100 minutes.

In the final step, the reaction mixture obtained in step 2 was stripped in a rotary evaporator at 0.7 mm Hg (bath temperature 100° C) to yield a mixed polyether ureylenethioureylene compound having terminal primary amino groups. The mixed compound showed an osmometric molecular weight of 930 and analyzed as follows: 1.99 meq primary amine/g.

EXAMPLE IX

In this example, a urea-formaldehyde resin in accordance with the instant invention was prepared using the polyoxypropylene bis(ureide) obtained in Example I. In an appropriate vessel 516 g of the reaction product obtained in the Example I was heated at 50° to 60° C. To the heated resin was added 266.4 g of 37% aqueous formaldehyde solution with stirring. A clear colorless solution resulted which on analysis showed: Brookfield viscosity, 1400 cp at 25° C; pH, 8.3; 1.04% free formaldehyde.

The product was stored for about 4 weeks at room temperature and again analyzed. The stored product showed: Brookfield viscosity, 2200 cp at 25° C; pH, 7.6; 0.63% free formaldehyde.

EXAMPLE X

In this example, a urea-formaldehyde resin was prepared using polyoxypropylene-ureide obtained in Example II. In an appropriate vessel, 621 g of the reaction product obtained in Example II was stirred for 30 minutes with 50.1 g of a 37% aqueous formaldehyde solution. A water-clear, colorless solution resulted.

EXAMPLE XI

In this example, a urea-formaldehyde resin was prepared using the polyoxypropylene-tris-ureide prepared in Example III. Into an appropriate vessel, were charged 389 g of the tris-ureide obtained in Example III, 200 g ethanol and 156.5 g of a 37% aqueous formaldehyde solution. The mixture was stirred overnight to obtain a clear yellow solution.

EXAMPLE XII

In this example, the urea-formaldehyde precursors prepared in Examples IX and X were cured to form the corresponding molded resin. Into a standard aluminum mold was poured an amount as shown in Table I of the urea-formaldehyde adduct and 1 g ammonium chloride which was previously dissolved in 3.1 g water. The molds were cured at 80°–90° for one hour.

TABLE I

|  | Run 1 | Run 2 | Run 3 |
|---|---|---|---|
| Adduct Example IX (pbw) | 97 | 27 |  |
| Adduct Example X (pbw) |  | 70 | 97 |

In addition to the preparation shown in Table I the urea-formaldehyde adduct of Example IX was utilized to prepare molds containing a plaster of paris filler and a hydrated aluminum oxide filler. The molds were prepared as shown in Table II below.

TABLE II

|  | Run 1 | Run 2 |
|---|---|---|
| Adduct Example IX (pbw) | 97 | 97 |
| Plaster of Paris (pbw) | 68 |  |
| Aluminum Oxide[1](pbw) |  | 30 |

[1]"Hydrol" 705 sold by Alcoa

The cured mold preparations produced resilient, dense foam products which showed minimal shrinkage after being stored for extended times. Those preparations containing the filler were more rigid and dense than those cured materials which did not contain the filler material.

EXAMPLE XIII

In this example, urea-formaldehyde coating was prepared and applied to a 50/50 polyester-cotton cloth. As a coating material, 97 g of the formldehyde-urea adduct prepared in Example I catalyzed by 1 g of ammonium chloride dissolved in 3.1 g water was used. The cloth was impregnated with the coating solution and air dried at room temperature. The coating was then cured one hour at 80°-90° C. The resulting flexible resin-coated cloth was immersed in distilled water overnight and redried. The coating appeared smooth and did not demonstrate wrinkling or creasing when bent and otherwise manipulated.

EXAMPLE XIV

In this example, the urea-formaldehyde adduct as prepared in Example III was applied to an aluminum plate. The adduct was admixed with appropriate aqueous aluminum chloride as a catalyst. The coated plate was dried in air and cured for two hours at 150° C. The resulting coating was smooth, not visibly affected by a one hour immersion in distilled water and withstood a reverse impact of 20 lb/inches.

While the invention has been explained in relation to its preferred embodiment, it is to be understood that various modifications thereof will become apparent to those skilled in the art upon reading the specification and is intended to cover such modifications as fall within the scope of the appended claims.

What is claimed is:

1. In a method for preparing a urea-formaldehyde condensate with the improvement which comprises contacting the aldehyde with a polyether polyureide formed by the reaction of a ureido group forming compound with a compound selected from a polyoxyalkylenepolyamine of the formula

wherein Y is a hydrogen, a methyl radical or an ethyl radical; Z is a hydrocarbon radical having from 2 to 5 carbon atoms and n is a number from 1 to about 20.

2. The method of claim 1 wherein the ureido forming compound is selected from urea and isocyanates of the general formula $M^+NCO^-$ wherein $M^+$ is an alkali metal.

3. The method of claim 2 wherein the ureido forming compound is urea and wherein Y is a methyl radical, n is a number from 2 to 17 and Z is a 1,2-propylene radical.

4. The method of claim 3 wherein said polyoxyalkylenepolyamine has a molecular weight of about 2000.

5. The method of claim 4 wherein said polyoxyalkylenepolyamine has a molecular weight of about 400.

6. A polyether containing urea-aldehyde resin comprising the condensation product of an aldehyde and a ureido-terminated polyoxyalkylene of the formula:

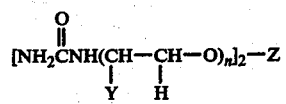

wherein Y is hydrogen, a methyl radical or an ethyl radical; Z is a hydrocarbon radical having 2 to 5 carbon atoms and n is a number from 1 to about 20.

7. The polyether containing urea-aldehyde resin of claim 6 wherein Y is a methyl radical; n is a number from 2 to 17 and Z is a 1,2-propylene radical.

8. The polyether containing urea-aldehyde resin of claim 7 wherein the ureido terminated polyoxyalkylene has a molecular weight of about 2000.

9. The polyether containing urea-aldehyde resin of claim 7 wherein the ureido terminated polyoxyalkylene has a molecular weight of about 400.

10. The polyether containing urea-aldehyde resin of claim 6 wherein said aldehyde is selected from the group consisting of glyoxal, acetaldehyde, acrolein, furfural, and formaldehyde.

* * * * *